H. ROWNTREE.
CONTROL MECHANISM FOR AUTOMATICALLY OPERATING APPARATUS.
APPLICATION FILED SEPT. 29, 1913.

1,268,156.

Patented June 4, 1918.
2 SHEETS—SHEET 1.

Witnesses:
Inventor
Harold Rowntree
By his Attorney
Samuel E. Darby

UNITED STATES PATENT OFFICE.

HAROLD ROWNTREE, OF KENILWORTH, ILLINOIS, ASSIGNOR TO NATIONAL PNEUMATIC COMPANY, OF NEW YORK, N. Y., A CORPORATION OF WEST VIRGINIA.

CONTROL MECHANISM FOR AUTOMATICALLY-OPERATING APPARATUS.

1,268,156.     Specification of Letters Patent.     Patented June 4, 1918.

Application filed September 29, 1913. Serial No. 792,392.

*To all whom it may concern:*

Be it known that I, HAROLD ROWNTREE, a citizen of the United States, residing at Kenilworth, county of Cook, State of Illinois, have made a new and useful Invention in Control Mechanism for Automatically-Operating Apparatus, of which the following is a specification.

This invention relates to mechanism for automatically controlling the action or operation of automatic apparatus.

The object of the invention is to provide means, in a system wherein successive operations are desired, whereby the apparatus performing such operations is put into action automatically in the successive order desired.

A further object is to provide means for successively registering the calls for the operations of the apparatus to be actuated, and automatically setting such apparatus in action in the order such calls are registered.

A further object is to provide means whereby automatically operating apparatus is set in operation by calls made from various points in the order in which said calls are made. Other objects of the invention will appear more fully hereinafter.

The invention consists substantially in the construction, combination, location and relative arrangement of parts, all as will be more fully hereinafter set forth as shown in the accompanying drawings, and finally pointed out in the appended claims.

Referring to the accompanying drawings:—

According to the present methods of control, two distinct types of control systems are employed for automatic machinery in which such machinery is set in operation from different points, as for instance, telephones, elevators, dumbwaiters, telegraph apparatus, and the like, the control being ordinarily effected by calls made from different points of control. One customary method of control for such machinery or apparatus is to employ a central station, where one or more attendants receive the various calls from the different points, and from which control station such attendant or attendants make or put in operation or otherwise control the desired or necessary operations, and effect the necessary connections therefor, as asked for, or as indicated by the various calls sent in. If, for any reason, the required connections cannot be made at the time a call is sent into, or received at the central station, or if the apparatus to be set in operation according to a received call is not in condition at the moment to be operated according to the signal or call, a note is usually made by the central station operator, either physically or mentally, or by an annunciator, or otherwise, and the necessary connecting operations are put into action by the control station operator, as soon after the call or signal is received as possible, or as soon as the apparatus is ready for such operation. The ordinary central station or other form of telephone switch board, the ordinary type of passenger elevator, and the one-point control dumbwaiters are examples of this type of control. This method of control possesses the advantages of enabling the one making a call or signal to the central station to feel reasonably sure that the central station or switchboard operator will make the necessary connecting operations according to the call or signal received, as soon as it is possible or practicable to do so, without the annoyance of the one calling making repeated efforts to effect the desired connections or operations in case a call or signal is not immediately successful. This method, however, has the disadvantage of necessitating constant attendance of one or more operators at the central station or switchboard, with the accompanying incident of increased expense and the usual personal errors or delay, mistake, inattention or negligence such operators frequently display.

The second customary method of control, above referred to, is to have all the necessary connections for operation of the automatic apparatus made by means of the calls or signals themselves, which are made from the different points, thus avoiding a central station operator to perform the necessary connecting or controlling operations. The automatic telephone system, the full push type of dumbwaiters and passenger elevators, are examples of this method of control. The advantage of this method of control is that it avoids the necessity of a central station or switchboard operator, and it eliminates the possibility of error due to mistake, inattention or neglect on the part of such operator. It has the serious disadvantage of compelling the person making a call or signal to repeat his efforts over and over again in case of failure to secure the desired connections or operations on the first trial, due to the fact that the automatic machinery is already in use or operation from some other previous call or signal, thereby wasting the time and patience of the one making the call.

It is among the special purposes of the present invention to provide a control system for automatic machinery or apparatus of the nature referred to wherein the advantages of both the methods above mentioned are attained while the disadvantages of both are avoided.

In accordance with my present invention I propose to provide means for automatically recording each call or signal sent in and in the consecutive order in which they are received, and the moment the automatic apparatus or machinery has completed its operation as the result of one call or signal, and is free for a second operation, such second operation is at once inaugurated in accordance with the next successive recorded call or signal. In this way every call sent in will automatically effect its desired connections and set the automatic machinery in the desired operation if and when such machinery is ready therefor. But if such machinery is not ready to respond to a call because of being already in operation from a previous call, then as soon as the operation in response to the previous call is completed, such machinery will automatically start up in response to the call next in order of time, made, received or recorded.

In carrying out my present invention I propose to employ means for automatically recording or receiving the various calls or signals sent in from various points or at various times, in the consecutive order in which they are sent in or received and I utilize this record, likewise in successive order, to control the operation of the automatic machinery in correspondence with the calls as made. And I arrange operate and control the receiving or recording devices in such manner that successive calls may be recorded during the times the automatic machinery may be in operation from a previous call, but such subsequent calls so successively received and recorded will be stored up, so to speak, and will become effective in successive order to accomplish their desired control of the automatic machinery as such machinery becomes available or ready for such operation or control.

It is to be understood that in the various elements and details of my invention a wide variety of variation and change is permissible without departure from the broad scope and intent of my invention as broadly defined in the claims. It will also be understood that my invention is not to be limited or restricted in respect to the character of the automatic machinery or apparatus in connection with which my invention is to be used, nor in respect to the use to which such machinery or apparatus is put.

In one specific form of embodiment of the broad scope of my invention which I have selected for the purpose of illustration I employ a record strip of non conducting material which is arranged to be fed forward under suitable conditions of control of the feed thereof, and which in this form of my invention, is successively perforated in suitably differentiated manner when calls are made, and the differentiated perforations made therein are utilized to complete the desired control connections for the machinery or apparatus to be operated.

The record strip is shown at 1 in the form of a roll from which the strip is reeled as required, the feed thereof being effected in any suitable manner, as, for instance, by providing one or both edges thereof with equally spaced perforations to be engaged by similarly spaced pins or teeth in a feed wheel 2, over which the strip passes. From the feed wheel 2 the record strip passes underneath a movable member 3, the position of which is dependent upon the condition of the strip, as will be hereinafter explained. In the present instance the movable member 3 is in the form of a roller which is carried by an arm 4 pivotally mounted as at 5. After passing underneath the roller 3, the strip passes over and is engaged and fed forward by a second feed wheel 6. After passing from the feed wheel 6 the strip which has then accomplished its function may be guided to any suitable point or receptacle indicated at 8, as, for instance, by the guide roller 7.

In practice I prefer that the record strip be fed forward intermittently and through equal distances or lengths at each feeding movement thereof. I also prefer that the feed wheels 2, 6, be of the same diameter and rotate at the same speed of peripheral travel, and that each makes one complete revolution each time it is operated. By such an arrangement it will be seen that the same length of record strip is fed forward respectively by the feed wheels. Any suitable or convenient means for rotating the feed wheels 2, 6, may be employed. As an illustrative arrangement I have shown a simple construction for this purpose, and wherein wheels 2, 6, are respectively carried by shafts 9, 10, and cords 11, 12, are respectively wound on said shafts 9, 10, and secured at one end to said shafts while weights 13, 14, are suspended from the other ends of the cords. With this arrangement it will be understood that whenever either of the shafts 9, 10, is free to rotate its rotation will be effected by the weights 13 or 14, attached to the corresponding cord 11 or 12.

At a convenient point which I have shown as between the paper roll and the feed wheel 2, I provide a block 15$^d$, over which the record strip passes; and at another convenient point, which I have shown as located between the idler 3 and the feed wheel 6 is another block 16 over which the record strip passes.

With the feed wheels constructed, arranged and operating as above described it will be readily seen that if the wheel 2 is operated, or given successive complete rotations more frequently than wheel 6 is operated then the record strip after passing beyond wheel 2 will loop down into the space between wheels 2 and 6, or rather between the wheel 2 and block 16, and the loop portion will continue to accumulate in this space, according to the rapidity of operation of wheel 2, until the operations of wheel 6 are sufficient to feed forward the accumulated loop portion of the strip. If, therefore, at any given time when the wheel 2 is at rest and the portion of the record strip which at that time is lying over the block 15, is marked, or perforated in suitable manner, and then both the wheels 2 and 6 are revolved, the relation of the blocks 15, 16 is such that with one complete rotation of the wheels 2 and 6 the mark or perforation in the record strip, made while it was lying over block 15, will be brought exactly over the center of block 16. If however, only the wheel 2 is operated, then a corresponding length of the record strip will be delivered by said wheel 2 into the space between wheel 2 and block 16, so that as soon as wheel 6 is ready for operation and is operated, the next successive marked or perforated point of the record strip will be brought into proper position of the center of block 16, and so on for as many successive operations as may be desired.

Over the block 15 I arrange a series of record strip marking or perforating, or other suitable recording devices and associated operating means therefor. In the drawings, I have shown only one of such devices with its associated operating means, but a description of the operation and relation of the one shown will suffice for all.

My invention, however, as broadly defined in the claims, is not to be limited or restricted to the particular construction shown and now to be described.

In the form shown, I mount a series of pivoted levers 17 in such relation that a perforation tip 18, on one end of each lever is brought over a corresponding hole 19, through the bar 15. Over the other end of each lever is arranged a magnet 20, so that when any magnet 20 is energized the perforating tip 18 of the corresponding lever 17, is depressed into the hole 19 of the block 15 thereby perforating the record strip lying between. When said magnet is deënergized the lever 17 returns to normal position and withdraws the tip 18, above the record strip.

It is to be understood that under the simplest conditions there are as many levers 17, and operating magnets 20 placed in line with each other transversely across the record strip as there are different controlling operations to be set into action, and the perforating tips 18 of said levers are to be arranged in line with each other. While this is the simplest form and condition, my invention is not by any means to be limited in these respects. It is obvious that the perforating or marking tips 18 may be arranged in any desired grouping, and under more complex conditions, and in extending the range of application of my invention to large numbers of operations or calls to be inaugurated or received, such a grouping of the levers 17, or the tip portions 18 thereof, as may be required can be readily accomplished in accordance with my invention. For instance, if there are a hundred different controlling operations to be inaugurated, this could be accomplished with only twenty of these levers 17, by dividing the operations to be controlled into say, ten groups of ten each, and employing ten of the levers 17, to designate respectively the ten groups and the other ten levers 17 to respectively designate the particular number of any group desired. Thus if two magnets 20 are simultaneously energized, one of them typifying the fourth group and the other the seventh number, then two holes would be simultaneously punched in the record strip, and these two holes, by their relative positions would correspond to the controlling operation numbered forty-seven. Whatever be the number, relation and arrangement of the levers 17, the essential thing is that there must be exact correspondence in number, relation and arrangement, of levers 25, now to be described.

Arranged over the block 16 is a series of levers, one of which is shown at 25, and each having a tip 26, preferably somewhat smaller in size than the tips 18 of the levers 17. These levers 25, in like manner to levers 17, are arranged in a line transversely across the strip of record paper. A transverse bar 29, extends across the rear ends of the levers 25, and said bar is attached to the core 28, of a solenoid 27. When this solenoid is energized the bar 29 is raised from engagement with the rear ends of the lever 25, thereby permitting the other ends of said levers to fall onto the record strip over block 16, and to rest freely thereon. Now, whenever a lever 17 is operated to effect a perforation in the record strip, sooner or later in regular sequence of operation that particular perforation is brought into position over block 16, for the tip 26, of the corresponding lever 25, when resting in the record strip, to pass through said perforation and make electrical contact with the block 16, while no contact is effected at that time between block 16 and the other levers 25 the tips of which are also resting upon the surface of the record strip over said block.

The solenoid plunger 28 has an extension or rod 29ª, which extends through the upper end of the solenoid and is attached to a lever 30, whereby said lever is rocked into connection with the contact 32, when the solenoid is energized, and into connection with contact 31, when the circuit of the solenoid is opened.

The armature 22 of a small magnet 21 is arranged to make connection with contact 23, when the circuit of said magnet is opened, and to make connection with contact 24, when said magnet is energized. Preferably these contacts 23, 24, are constructed to have a limited amount of movement so that they will follow up the armature lever 22 when the latter moves and maintain contact therewith until said lever has completed its connection with the other of said contacts.

I prefer to employ the same arrangement of follow up contact with the contacts 31, 32, above referred to.

In accordance with my invention I provide means for stopping the feed wheel 2 after it has made one complete rotation, and also certain contact devices which are controlled by the rotation of said wheel, and while I have shown and will now describe a simple construction and arrangement as practical and operative embodiments of my invention in these respects, I wish it to be understood that my invention, as defined in the claims is not to be limited or restricted to the particular construction shown.

In the form shown a pivoted lever 33, is arranged at the side of wheel 2, the free end of which coöperates with a shoulder 64 formed on the side of the wheel 2 to form a stop for said wheel when said shoulder is brought up against the end of said lever. When said lever is rocked so as to carry its end out of engagement with shoulder 64, the wheel 2 is rotated by the weight 13. When the lever 33 is released it is free to drop into position to engage the shoulder as soon as the wheel 2 completes one revolution. The lever 33 is released from engagement with the shoulder by the energization of a magnet 34, placed above the same, and when the circuit of said magnet is opened, said lever is free to fall into position to engage the shoulder.

Adjacent the side of the wheel 2 is another pivoted lever the free end of which is arranged to work against a cam surface 36 carried by the side of the wheel 2. At the point 37, this cam is provided with a marked change in its diameter. This point in the cam surface is arranged in such relation that when the lever 33 falls into engaging relation with reference to shoulder 64, that is, as wheel 2 completes one revolution and is again locked, the lever 35, drops from the raised part of the surface of cam 36, at the point 37, onto the narrow diameter of the cam. When the lever 33 is disengaged from shoulder 64, and the wheel 2 begins to rotate the lever 35 is gradually rocked by the increasing diameter of the cam surface 36 on which said lever rests, until the point is reached where the lever 33 again engages the shoulder 64, that is when, the wheel 2 completes one revolution then the lever 35 again drops to the narrow point of cam 36. The levers 33, 35, may be impelled into engaging relation with the shoulder 64, and cam 36, in any convenient manner. A simple arrangement is shown wherein said levers are connected together by a spring 35ª. The lever 35 carries an insulated contact 38 which connects with a contact 39, when said lever is on the narrow part of the cam surface 36, but the contact is broken therebetween when said lever is rocked outwardly by the increasing diameter of the cam 36.

A similar arrangement of stop and contact lever is associated with wheel 6. As shown, a lever 40, controlled by a magnet 42, coöperates with a stop shoulder 41 on the face of wheel 6, while a contact lever 43, normally rests against a back stop 47, in position to hold a contact 45, out of connection with a contact 46. A spring 45ª connects said levers 40, 43. A cam 44 on the side of wheel 6, engages the lever 43 during a part of the rotation of wheel 6, to rock said lever into position for contacts 45, 46, to make connection with each other.

I will now describe the wiring connections and operation of the appartus I have shown as an exemplification of my invention.

The main switch is shown as at 48, while 49, designates a push box in which I have shown three push buttons as typifying and illustrating my invention, that is, in the arrangement and circuit connections shown to illustrate my invention, three different controlling operations to be inaugurated are contemplated.

Reference numeral 50 designates a switch which is opened whenever the automatic machine or apparatus to be controlled is in operation, or so long as any particular series or cycle of operations, once inaugurated, have not been completed. The switch 50, however, is intended to be closed whenever the automatic machine or apparatus is ready for inaugurating a new operation or series or cycle of operations said switch being opened again the moment the machine or apparatus has started up to carry out the directions for the new operation.

From the main through switch 48, a wire $a$, leads to push button 52, thence to a magnet 20, and to binding post 51, which is the common return of all the magnets 20. From binding post 51, the circuit $a$, continues to arm 61, contact 60, to contact 23, lever 22, contact 38 on arm 35, contact 39 to the return through switch 48. This circuit $a$, as just traced, also leads to all of the push buttons of the box 49, but I have followed said circuit only through one of the push buttons, namely the push button 52. When therefore, this button is pushed the circuit above traced is completed through the particular magnet 20 corresponding to the button 52. Of course if any other push button of the box 49 is depressed a similar circuit is completed to the particular magnet 20 corresponding to that button, and consequently the corresponding lever 17 will be depressed and a corresponding perforation of the record strip will be accomplished. The rocking movement of lever 17 thus accomplished completes connection between said lever and a contact 53, thereby completing circuit as follows: from the main through switch 48, wire $b$, to magnet 21, to lever 17, contact 53, wire $b$, to lever 22, and thence through circuit $a$, above traced to return. The completion of circuit $b$, energizes magnet 21, and moves armature lever 22, into connection with contact 24 and breaking connection between said armature lever 22 and contact 23. Since the return connections of all the magnets 20 are through contact 23, the breaking of the connection of said contact with the lever 22, breaks the circuits of any magnet 20 that had been energized primarily by pushing the button of the box 49, and consequently the particular lever 17, that had been operated is returned or restored to normal position thereby breaking the connection between said lever and contact 53. This however, does not break the circuit of magnet 21 because when said magnet is primarily energized by the closing of the circuit $b$, as above traced, the armature lever 22 is drawn against contact 24, and the moment this contact is made the following circuit is made; from the main switch 48, wire $b$, magnet 21, wire $c$, contact 24, lever 22, and on to return through wire $a$, as above traced. The magnet 21 will therefore remain energized. Carried by each lever 17, but insulated therefrom is a contact 54 which connects with a contact 55, when the lever 17 is in normal position. The sets of contacts 54, 55, are wired in series so that circuit connection therethrough will be completed only when all the levers 17 are in normal position, and this circuit will be broken when any one of said levers is operated by its associated magnet 20. When therefore lever 22 has established connection with contact 24, the lever 17 which had been operated to cause lever 22 to move into connection with contact 24, will drop back into normal position with all the other levers 17, thereby assuring that all the perforating tips 18 are clear of the record strip, whereupon the following circuit is completed: from the main switch through wire $d$, all the contacts 55, 54 in series, wires $d$, magnet 34, wire $d$ to contact 24, lever 22, and return through circuit $a$. The completion of this circuit causes magnet 34 to become energized thereby raising lever 33 out of locking relation with respect to shoulder 64 on feed wheel 2, and thereby permitting said wheel to start to revolve. It will be understood of course that this feeding movement is not inaugurated until after the record strip has been marked or perforated by the operation of the lever 17, as above explained. As the wheel 2 begins its rotation the cam 36 moves the lever 35 so as to break the connection between contacts 38 and 39. This breaks all circuits which are grounded through circuit $a$, and consequently both magnets 21 and 34 are deënergized. The deënergization of magnet 34 causes lever 33 to be released so as to permit it to drop into position to form a stop for shoulder 64 when wheel 2 completes one rotation. At the time the wheel 2 completes its revolution, and is locked by lever 33 preparatory to the next cycle of operations, the lever 35 drops over the edge 37 of cam 36, and thereby remakes connection between contacts 38, 39. This, however, does not cause any of the magnets to be reënergized since the previous opening of the circuit between contacts 38, 39, as above explained, caused magnet 21 to become deënergized and consequently armature lever 22 has dropped back to normal position out of connection with a contact 24, and into connection with a contact 23, thereby breaking the return of both magnets 34 and 21. When the contacts 38, 39, are again brought into connection with each other the apparatus above described is ready for the next operation which can be immediately inaugurated as soon as the feed wheel 2 completes its revolution and is again locked.

It will be readily understood that the entire cycle of operations above described would not consume any appreciable time and consequently successive calls or operations may be made or inaugurated rapidly, and correctly recorded on the record strip in successive order, and the record strip advanced or fed forward one step, or through a definite distance at each operation. It will be seen that merely a momentary closing of the call circuit by simply pushing one of the buttons in the push box 49, is all that is required to inaugurate the desired operation and when the operation is one inaugurated it is carried out automatically thereby making a permanent successive record of the various calls made and in such a manner as to enable the cycle of operation to be completed as will be hereinafter pointed out automatically and in the successive order in which such calls are primarily made. The completion of the call circuit by the depression of the push button need be only momentary since the magnet 21 when energized instantly makes its own circuit complete by the armature lever 22 contacting with the contact 24, while the breaking of the circuit between armature 22 and contact 23 makes it immaterial whether the push box contact is immediately opened again or not.

As each call is thus recorded on the record strip, said strip is fed forward or advanced and will loop down between the wheel 2 and the block 16 if the mechanism to be controlled is not in condition to be operated according to the directions or requirements of the particular call made. Suppose, however, that the mechanism to be operated is in condition and ready to be operated in accordance with a call made and registered or recorded on the record strip as above explained. The forward feed of the record strip when a call is sent in and registered or recorded thereon, relieves the tension exerted by the strip on the roller 3 by the slack in the strip when advanced by wheel 2 and thereby the lever 4 moves into position to close circuit between contacts 56 and 57. Thereupon the following circuit is completed: from the main through switch 48, wire e, switch 50, which at this time is closed, since it is now being assumed that the machine to be controlled is ready and waiting directions for its operation, wire e, contact 56, contact 57, wire e, magnet 42, wire e, contact 31, lever 30, wire e to return side of main switch 48. This circuit e, of course will not be closed unless the machine or apparatus to be operated is at rest and ready to receive directions, for, as above explained, that condition must obtain in order for switch 50 to be closed. The completion of the circuit causes magnet 42 to become energized. This releases lever 40 from shoulder 41 and thereupon a feed movement of wheel 6 commences. As wheel 6 continues in its revolutions the lug or cam 44 will engage lever 43 and move the same into position for circuit to be closed between contacts 45 and 46, the contact 46 being preferably a yielding one. When these contacts close upon each other the following circuit is completed: from main switch 48, wire e, switch 50 wire f solenoid 27, wire f, contact 45, contact 46, wire f to return side of switch 48. The completion of this circuit causes solenoid 27 to become energized, thereby raising the core 28, which moves lever 30 out of connection with contact 31, and into connection with contact 32. This breaks the circuit of magnet 42 and allows the lever 40 to move back into normal position to form a stop for shoulder 41 as soon as wheel 6 completes its revolution. The contact of lever 30 with contact 32 maintains the circuit of solenoid 27 closed through connection g, contact 32 and lever 30, on through circuit e to return as above traced.

When the solenoid 27 is energized and its core raised the bar 29 is raised thereby allowing all the tracing ends 26 of levers 25 to drop onto the record strip over the block 16 as the wheel 6 completes its revolution, and consequently the perforation in the record strip previously made by the actuation of the lever 17, will permit the tracing end 26 of the corresponding lever 25 to pass through said perforation and make contact with the bar 16. Thereupon the following circuit will be completed: from the main switch 48, wire e switch 50, wire h, bar 16, the particular lever 25 the tip 26 of which is in contact with bar 16 and by the corresponding one of the wires 58, each lever 25 being connected to a wire 58 and thence on through a wire 63, to the machine or apparatus to be controlled or actuated, and which machine or apparatus will immediately start up. The starting up of the machine will cause switch 50 to be opened, thereby breaking the circuit of solenoid 27. Whereupon the plunger 28 returns to its normal position, reëstablishes connection between lever 30 and contact 31 and causes all the levers 25 to be raised off the record strip and block 16.

The moment the machine or apparatus thus set in operation has completed its work and comes to rest the switch 50 will again be closed. If there is slack in the record strip between the roll 2 and block 16, that is, if there is a registered call on the record strip which has not yet been put through and consequently there is still a portion of the record strip looped down between the wheel 2 and block 16, then the contacts 56, 57, remain closed upon each other and consequently the instant the switch 50 is again closed after completion of a controlled operation of the machine or apparatus, by such machine coming to rest, then the circuit $e$ is again closed automatically by the closing of switch 50, and the cycle of operation above explained is repeated in respect to the next succeeding registered or recorded call, which has not yet been put through, and so on for all remaining registered or recorded calls which are awaiting to be fulfilled. If there are no registered or recorded calls awaiting action then the feed of the record strip by the wheel 6 will cause the record strip to raise the roller 3 thereby breaking circuit between contacts 56, 57, and therefore no action will take place until the next call comes in and the feed wheel 2 effects an advancement of the record strip to produce slack in the strip between wheel 2 and block 16. This will cause circuit connection to again be made between contacts 56, 57, and consequently as soon as the machine or apparatus to be operated is in condition therefor, and the switch 50 is closed, the cycle of operation is again carried out. Thus it will be seen that whenever, and so long as there is a registered or recorded call awaiting action, the closing of switch 50 will automatically cause a resumption of operations and such operations will be carried out according to the directions of the call.

The operating connections above described are effected where all the received calls are recorded on the record strip thereby making a permanent record of all such calls. It may sometimes be desired, however to record only those calls which are sent in when the controlled machine is already in use from or as a result of a previous call, and that when the machine is not in use, and no registered calls are awaiting action, to have the calls pass directly to the controlled machine without affecting the automatic registering or recording apparatus. This may be accomplished in different ways. I have shown one arrangement for the purpose, but I do not desire to be restricted or limited to the particular arrangement shown. In the form shown I provide the arm or lever 4 with another contact 58, which coöperates with a contact 59, to close circuit connection therebetween whenever the arm 4 is raised by the record strip acting upon roller 3 and to open said circuit connection when slack is produced in the record strip between wheel 2 and block 16. One of the contacts 58, 59 is preferably a follow up or spring contact in order to allow for slight variations in the position of lever 4. When switch 50 is closed, that is, when the machine to be controlled is ready and in condition for another operation, as above explained, and when contacts 58, 59 are closed upon each other, that is when there are no registered calls awaiting action, and these two conditions occur at the same time, the next succeeding call received can be sent direct to the controlled machine through the following circuit: from the main through switch 48, wire $e$, switch 50, wire $e$ to contact 56, which is in electrical connection with contact 58 to contact 59, wire $k$, solenoid 62, wire $k$ and wire $e$ to the return side of switch 48. This causes solenoid 62 to become energized thereby moving contacts 66 against contacts 65, and at the same time breaking contact between lever 61 and contact 60. The contacts 66 are respectively connected to the wires 58, while the contacts 65 are respectively connected to the push buttons in the box 49. By separating lever 61 and contact 60, the connection from the common return 51 of all the magnets 20 to the return of switch 48 is broken. Consequently, when solenoid 62 is energized pressure on any of the push buttons in the box 49, will not effect a corresponding magnet 20, but will instead, close the following circuit: from the main switch through switch 48, wire $a$, the particular push button that is pushed, say button 52, wire $a$, corresponding contact 65, contact 66 and wire 63 to the machine or apparatus. The moment the controlled machine starts into action the switch 50 is opened thereby breaking the circuit of solenoid 62 and hence breaking the connections between the push button box and the controlled machine and reëstablishing push button box control over the register or recorder magnets 20 through the closing of lever 61 upon contact 60. Consequently any calls received while the controlled machine or apparatus is busy, or when there are any registered or recorded and unanswered calls waiting, will be received by the recording devices. But a call received when there are no unanswered recorded calls and when the machine is idle will be connected directly to the controlled machine.

From the foregoing description it will be seen that I provide an exceedingly simple and efficient means whereby any machine or apparatus that is required to respond to electric circuits in a certain corresponding way, can have the calls for the required circuit connections automatically recorded, stored up and automatically forwarded to the controlled apparatus as soon as it is ready therefor. Thus calls for an automatic dumbwaiter or automatic elevator can by the use of my invention, be recorded and retained whenever the dumbwaiter or elevator is already in use or is not in condition to respond to the call, and until it is ready to respond or has completed the service in which it was engaged, and then such call will be automatically forwarded on to the machine as soon as it is at liberty to respond. The apparatus described is also useful in the case of telephone systems where calls may be recorded and retained until a desired connection is in condition to receive it when such call will be automatically forwarded. For use in connection with telegraph systems a telegram for instance which must be relayed at some intermediate point in the line of its transmission, will be automatically relayed, being received, recorded, and retained until the forwarding line is available and then automatically forwarded immediately the forwarding line is available and the different messages received thus forwarded automatically in the same consecutive order in which they are received.

Figure 2:
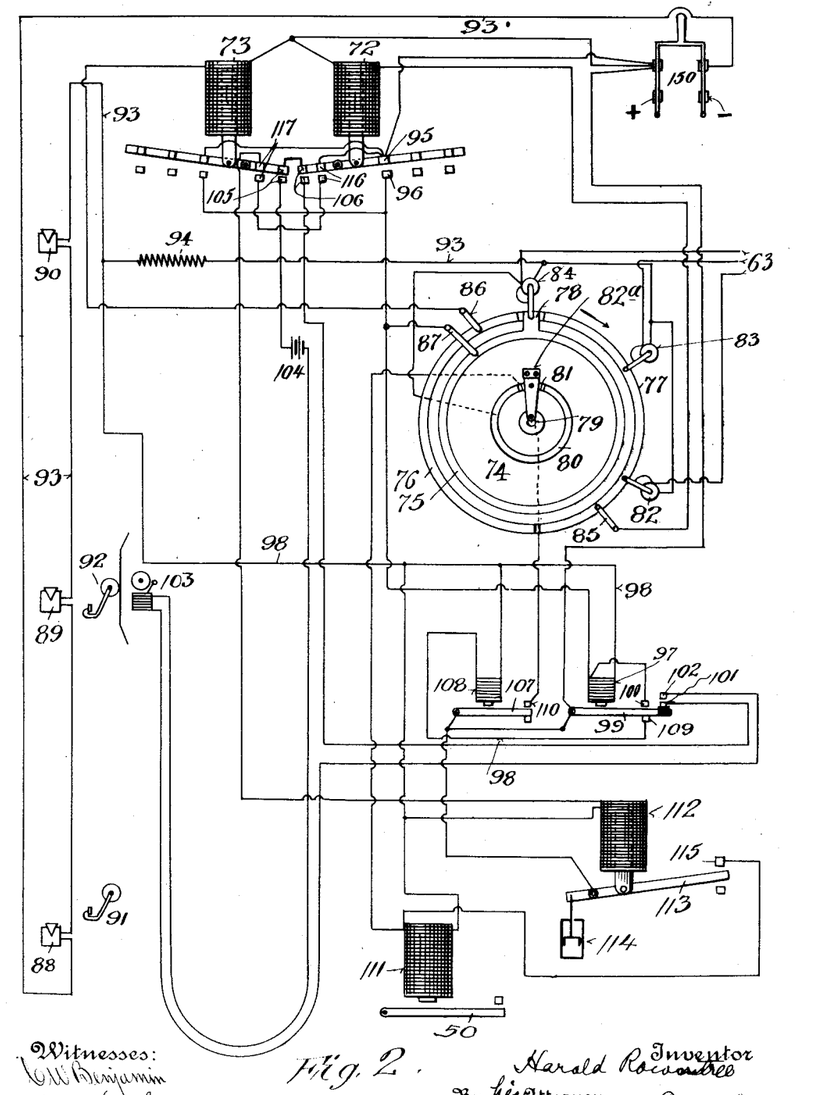
Fig. 2 is a similar view showing the application of the invention to the automatic control of automatically operating dumbwaiters.

In Fig. 2 I have shown a construction and arrangement of an automatic dumbwaiter system in connection with a control mechanism embodying my invention merely as an illustration of one form of practical application of the invention. It is to be understood however, as above pointed out, that my invention is not to be limited or restricted in respect to the particular construction, type or purpose of automatic machinery or apparatus to be controlled, but is applicable with equal facility to any type or system of automatic machinery or apparatus.

In illustrating a dumbwaiter system in Fig. 2 I have omitted the hoisting motor as well as the car, as these are too well known in the art to require illustration or description. Any type of hoisting motor may be employed which operates or moves the car in one direction when the solenoid 72 is energized and in the opposite direction when the solenoid 73 is energized.

In connection with the hoisting motor I employ the well known type of circular controlling slate 74, which, in the usual manner is driven by the hoisting motor so as to rotatively move in one direction approximately one half a revolution while the car is moving from one limit to the other of its travel and in the other direction approximately through the same extent when the car moves between the limits of its travel in the reverse direction. The slate 74 is provided with contact strips the outer one of which is divided into the two separated sections 76, 77, with a small section 78, intermediate the ends of said sections, and which section 78 is connected with or forms a part of an inner contact ring 75. Near the center of the slate 74 is mounted a stationary slate which carries the contact rings 79, 80, the contact ring 80 being separated at its ends and having a small independent section 81 interposed therebetween. Mounted on slate 74 and moving with it is an arm 82, which carries contacts designed to coöperate respectively with contact rings 79, and 80, 81.

Adjacent the rotary slate 74, are shown the magnets 82, 83, 94, which in this instance correspond with and typify three different floors at which the dumbwaiter car is intended to stop. The armatures of these magnets are designed to make contact with the contact sections 76, 77 or 78, according to the position occupied by the slate 74, it being understood that the magnets are mounted on a stationary support. Also mounted on the stationary support are brushes 85, 86, which bear respectively on the contact ring sections 77 and 76, and a brush 87 which bears on the contact ring 75.

I have also indicated door switches 88, 89, 90, which are respectively located at the three floors at which, in the system illustrated the car is designed to stop, and each designed to be associated with the hatchway doors at the floors in such manner that when any hatchway door is open its associated switch is opened, and when the door is closed its switch is also closed.

At 91, 92, I have indicated a form of door lock, designed to hold the hatchway doors locked in closed position, the lock of any particular door being released by a cam or shoe carried by the car when the car is opposite the door. Illustration of a lock for the upper door, corresponding to switch 90, has been omitted from the drawing in order to avoid unnecessary complication of the drawing. A signal bell is also indicated at 105, and is designed to be carried by the car.

The particular type of dumbwaiter shown is intended for use in collecting material from different floors of buildings and delivering the same to the first or main floor, and in its operation and control there would be one push button at each floor. These are the push buttons indicated in Fig. 1, as included in the push button box 49. In the case of the type of dumbwaiter shown in Fig. 2, however instead of these push buttons being all located in one box and at one point they would be distributed one at each floor adjacent the hatchway door thereof. If for example, material was to be delivered from the third floor to the first or main floor the push button on the third floor would be pushed and thereupon, as will be hereinafter described, the car would travel to the third floor where it would automatically stop and the bell in the car would immediately begin to ring. As soon as the hatchway door is opened at the third floor the door switch, say switch 90, would be opened and the bell on the car would cease ringing. The material would then be loaded into the car and the door closed. The closing of the door would automatically start up the motor to move the car back to the first floor and there automatically stop it and the bell on the car would then begin to ring and continue to do so until the door at the first or main floor is opened. The moment this door is again closed that circuit would be closed which controls the switch 50, Fig. 1, thereby closing said switch, and if there are any calls awaiting action the automatic controller would put the next successive one in service, or if there are no waiting calls, previously made, then the apparatus will be in condition to respond to the operation directly incident to pushing any one of the buttons. Furthermore, if after the car is sent to a particular floor, it is for any reason neglected and the door is not opened for a certain length of time, then the circuit would be automatically completed at the expiration of that length of time so as to close switch 50, and enable the next call to be put into service. I will now describe how these operations are accomplished.

Figure 1:
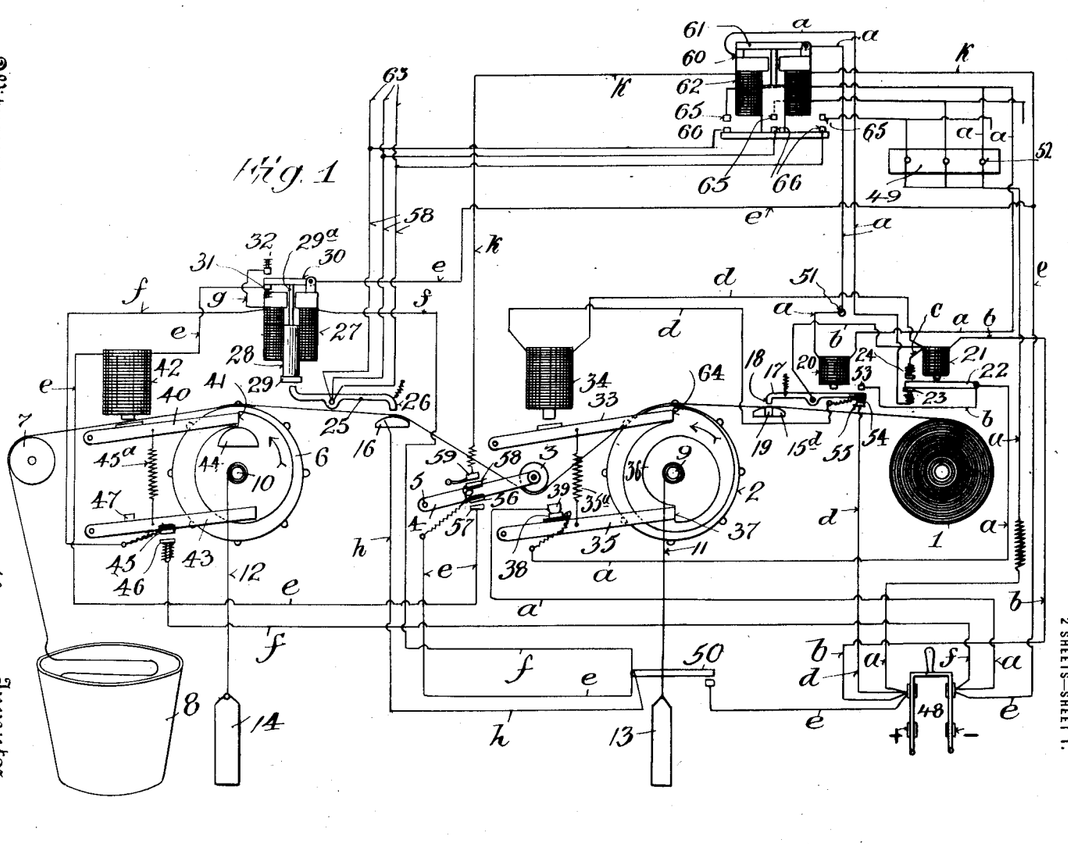
Figure 1 is a view in diagram showing the application of an automatic control mechanism for automatically operating apparatus embodying the principles of my invention.

I have above explained that whether a call is sent by the direct action of pushing a call button, or is sent through and by the automatic controller, in either case current is sent to one or another of the wires 63. These wires respectively include in circuit therewith the windings of magnets 82, 83, 84. It is to be understood of course that there will be as many push buttons, wires 63 and magnets 82, 83, 84, etc., as there are floors. Let us suppose that the push button 52, Fig. 1 is depressed or that the automatic controller has operated to connect with current source the same wire 63 that would have been so connected when button 52 is depressed as heretofore explained, and that magnet 82 is included in the same circuit with the wire so connected, and that this magnet corresponds to the third floor at which the car is to stop. The following circuit would thereupon be completed: from the positive side of main switch 48, Fig. 1 to the conductor wire 63 which includes the magnet 82, as heretofore explained, through the coils of said magnet 82, to a wire 93 which forms a common return for all the magnets 82, 83, 84, etc., and which common return wire 93, includes, in series, the resistance 94, and the door switches 90, 89, and 88, and is finally connected to the negative side of a main switch 150. The closing of this circuit causes magnet 82 to be energized thereby causing its armature to be pulled into contact with conductor segment 77, assuming the parts to occupy the relative positions as indicated in Fig. 2. Thereupon the following circuit will be completed: from the positive side of main switch 150 the solenoid 72, brush 85, conductor segment 77, armature of magnet 82, through the magnet 82, common return 93, resistance 94, door switches 90, 89 and 88, to the negative side of the main switch. The closing of this circuit causes the solenoid 72 to become energized. Suppose this is the "up" solenoid, that is, the one which controls the switch which when closed starts up the hoisting motor in a direction to raise the car. The energization of this solenoid causes it to close the contacts 95, 96, upon each other, thereby completing the following circuit: from the positive side of the main switch 150, contact 95, contact 96, the coils of the magnet 97, wire 98, and return wire 93, to the negative side of the main switch through the door switches as above explained. The resulting energization of magnet 97, causes its armature 99 to close upon contact 100, whereupon the following circuit is completed: from the positive side of the main switch 150, to armature 99, contact 100, then through the magnet coil 97, and wire 98, to return through wire 93, as above described.

As above explained the energization of solenoid 72, closes the switch which controls the hoisting motor (not shown) so that upon completion of the circuit of said solenoid the hoisting motor starts up and the car is raised. As the hoisting motor starts up the circular contact slate 74 which is geared thereto and driven therefrom begins a rotative movement in the direction indicated by the arrow. As this rotative movement continues the conductor segment 77, will eventually pass from contacting relation with the end of the armature of magnet 82, and said armature will be brought into contact with the conductor section 78, of ring 75. The moment this occurs the following circuit is completed: from the positive side of main switch 150, through contacts 95, 96, brush 87, ring 75, section 78, armature of magnet 82, said magnet, wire 98 and return wire 93 to the negative side of the main switch. This action in effect, short circuits the solenoid 72, as it puts the full current pressure on both sides of said solenoid. The solenoid therefore becomes deënergized and consequently the motor switch which it controls would be opened, thereby causing the motor to stop. The same action breaks circuit connection between the contacts 95, 96, which breaks the circuit which had just previously been established through them, and last above traced, and which contains the magnet 82, thereby deënergizing said magnet and allowing its armature to separate from contact with the conductor section 78.

I have not shown or described the usual electric brake, nor the slowing up and other accessory devices which are commonly employed in connection with automatically operating dumb waiters, elevators or other machines, as they form no part of the present invention, and illustration and description of the same would merely complicate the illustration and description without any advantage so far as setting forth the invention claimed herein is concerned.

The opening of the motor switch resulting from the deënergization of solenoid 72, as above explained, thereby separating contacts 95, 96, also breaks the circuit above traced which includes these contacts and the coil of magnet 97. But the breaking of this circuit by the separation of contacts 95, 96, would not cause the magnet 97 to become deenergized because the other circuit through said magnet direct from the switch 150, and through armature 99 and contact 100, as above referred to, remains closed. Upon the end of armature 99, but insulated therefrom, is carried a contact 101 which is moved into contacting relation with a contact 102, whenever magnet 97 is energized. The contacts 101, 102, are included in the circuit of the signal device 103, shown in this instance as a bell and which as before explained, is carried by the car. The closing of this signal circuit at the points 101, 102, however, does not necessarily cause the signal device to operate. It will be observed that this signal circuit which includes the battery or other current source 104, also includes the pairs of contacts 106, 105. These pairs of contacts are respectively controlled by the switches which are operated by the solenoids 72, 73 and the members thereof are respectively closed upon each other only when said solenoids are deënergized. In other words both solenoids 72, 73, must be deënergized before the signal circuit is completed. The signal device, therefore will not operate when the car is in motion but the moment the car stops, that is, the moment the solenoids 72, 73 are deënergized the signal device begins to operate and will continue to operate until a door is opened. The opening of any door will open the corresponding door switch and since the door switches are included in series in the circuit which is energizing the magnet 97, the opening of the door breaks the circuit of magnet 97, thereby pemitting its armature 99, to move so as to separate contacts 101, 102, and consequently opening the signal circuit.

I have now described how the pushing of the button in the box 49 starts up the automatic apparatus to be controlled, and how in the case selected for illustration, the car hoisting motor is automatically arrested by the opening of its circuit. It will be understood of course that the magnets 82, 83, 84 & etc., are so positioned circumferentially with respect to the slate that the conductor segment 78, is brought into contact with the armature of the active one of said magnets only when the car reaches the particular floor corresponding to the button which has been pushed.

Suppose now, the car had reached the proper floor and the door at that floor has been opened and the material to be transferred has been loaded into or removed from the car and the hatch door has again been closed. Thereupon the following circuit is completed: from the positive side of the main switch 150, to armature 99, contact 109, magnet 108, wire 98 and return through wire 93. This energizes magnet 108, and moves armature 107 against a contact 110, thereby completing the following circuit: from the positive side of switch 150, armature 99, armature 107, contact 110, contact ring 79 of the slate 74, to arm 82ª, ring 80, to and through magnet 84, to return through wire 93. The closing of this circuit causes magnet 84 to become energized thereby drawing its armature into contact with contact segment 76. This completes the following circuit: from the positive side of switch 150 through solenoid 73, brush 86, contact segment 76, the armature of magnet 84, and return through wire 93. This energizes the solenoid 73 which controls the switch by which the car hoisting motor is set in operation in a direction to lower the car. The series of operations above described with reference to the raising travel of the car will then be carried out until the car is again brought to rest at the starting point. However, a different circuit is now completed after the car has stopped at the starting point after the hatch door at that point has been opened and then closed again in addition to the closing of the circuit of magnet 108, as follows: from the positive side of switch 150 to armature 99, armature 107, contact 110, inner ring 79, arm 82ª. To this point the circuit remains the same as above described, but when the car is at the starting point, say the first floor, the outer brush of arm 82ª, will contact with the intermediate portion 81 and not with the contact ring 80. Consequently the circuit continues from arm 82ª, through section 81, magnet 111, and return through wires 98 and 93. This energizes magnet 111, and closes switch 50, thereby placing the machine in condition ready for another call either direct from the push buttons or from the automatic controller through the registering apparatus as above described and as the case may be.

In the event the car is sent to a floor and the hatch door at that floor is not opened the entire system might be tied up through the failure to open and then close said door. To prevent this I employ a solenoid 112 which when energized, moves the switch arm 113, into contact with contact 115. A dash pot or other suitable means indicated at 114 controls the rate of movement of the switch arm 113, and causes the same to move slowly toward position to close said arm upon contact 115 when the magnet 112 is energized. Consequently a certain interval of time say thirty seconds, but which, of course can be readily adjusted as required or desired, must elapse after solenoid 112 is energized and before the arm 113 is closed upon contact 115. The circuit of solenoid 112 is completed as follows: from the positive side of the switch 150, to contact 95, to and through a pair of contacts 116, the switch device controlled by solenoid 72, and which are closed upon each other only when said solenoid 72 is deënergized thence to and through a pair of contacts 117, which in like manner are closed upon each other only when the solenoid 73 is deënergized thence to and through solenoid 112 to return through wires 98 and 93. The moment the car stops, therefore, and before a door is opened the solenoid 112 is energized and unless the door is opened within the period of time to which the time regulating device 114 is adjusted, the arm 113 will make contact with contact 115. If the door is opened within the time limit referred to the circuit of solenoid 112 will be broken and the arm 113 will then drop back to initial position. When the arm 113 closes onto contact 115, the following circuit is completed: from the positive side of switch 150, to armature 99, arm 113, contact 115, magnet 111, to return through wires 98 and 93 thereby energizing magnet 11 and closing switch 50, which, as above explained, places the push buttons, or the automatic controller as the case may be, in proper relation to make or to control the next succeeding operation of the apparatus to be controlled.

While for illustration purposes I have shown two main switches 48 and 150, it is to be understood that in practice the same switch will answer the purpose.

From the foregoing description it will be seen that I provide means which are simple and efficient for accomplishing the objects and purposes of my invention as hereinabove set forth, and wherein the various operations, when once inaugurated, are carried out in precise and orderly manner and in consecutive sequence.

Having now set forth the objects and nature of my invention and an operative embodiment of the principles thereof what I claim as new and useful and of my own invention and desire to secure by Letters Patent is:—

1. In a control system for automatic apparatus, a record strip, selectively controlled devices for perforating said strip, devices for advancing said strip after each perforating operation, the perforating devices, when operated, serving to close an electric circuit, means operated by the closing of said circuit for restoring said perforating devices, means also controlled by said circuit when closed for controlling the feed of the record strip, and means controlled by the perforations in said strip for correspondingly controlling the automatic apparatus.

2. In a control system for automatic apparatus and in combination with selectively controlled differentiated devices for recording calls for the operation of the automatic apparatus, of an automatic apparatus, correspondingly differentiated means for inaugurating successive operations of the automatic apparatus only after the completion of previously inaugurated operations thereof, a record made by said differentiated devices, said correspondingly differentiated means being controlled by said record.

3. In a control system for automatic apparatus and in combination with a call registering record strip, selectively controlled differentiated devices for recording the calls upon said strip and means controlled by the recorded calls for correspondingly inaugurating the operation of the automatic apparatus, of means for advancing the record strip including a feed wheel having a shoulder, a stop arm coöperating with said shoulder to arrest the feed wheel after each complete revolution thereof, electrical devices for controlling said stop arm, a circuit therefor, and means associated with the feed wheel, and operated by the rotation thereof, for controlling the circuit of said electrical devices.

4. In a control system for automatic apparatus and in combination with a call registering record strip, selectively controlled devices for registering the calls upon said strip, electrical means for operating said devices, feeding devices for said strip, electrical means for controlling said feeding devices, circuits for said electrical means, having a common return, means operated by the strip feeding devices for controlling said common return, and means controlled by the record made of the calls upon said strip for correspondingly inaugurating the operation of said automatic apparatus.

5. In a control system for automatic apparatus, selective control devices for the apparatus to be operated, differentiated call making and recording mechanism for the calls successively recording said calls, said control devices being controlled by the record made of the calls, in combination with means under the control of the recording mechanism, for effecting the control of the automatic apparatus directly from the selective devices.

6. In a control system for automatic apparatus, a call record strip, feeding mechanism therefor, selectively controlled devices for recording the calls on said strip, devices controlled by the record strip for inaugurating the operation of the automatic apparatus, and means controlled by the record strip feeding mechanism whereby said selectively controlled devices control directly the automatic apparatus.

7. In a control system for automatic apparatus, a call record strip, feeding mechanism therefor, devices for registering the calls upon said strip, selective means for controlling said devices, devices controlled by the record strip for successively inaugurating the operation of the automatic apparatus, a switch device for cutting out of action the call registering devices and completing connection direct from the selective means to the automatic apparatus, and means controlled by the strip feeding mechanism for operating said switch.

8. In a control system for automatic apparatus, a call record strip, feeding mechanism therefor, devices for registering the calls upon said strip, selective means for controlling said devices, means controlled by the record strip for successively inaugurating the operation of the automatic apparatus, a switch device for cutting out of operation the call registering and corresponding automatic apparatus controlling means, said switch, when operated, serving to connect the selective means direct to the automatic apparatus, electrical devices for operating said switch, a circuit therefor, and means operated by the strip feeding mechanism for controlling said circuit.

9. The combination with electrically controlled devices to be operated, of means for making and receiving calls for the operation of said devices, means for recording the calls in the order they are received, means controlled by the record made by each call in the order it is recorded for inaugurating the action of said devices to be operated and electrically operated means independent of said record for preventing the inauguration by the record made of a call of the action of said devices to be operated until said devices have completed the previously inaugurated action thereof.

10. In a control system for automatic apparatus, a record strip, independent electrically operated feeding devices therefor, perforating devices arranged in the rear of said feeding devices, means for operating said perforating devices in accordance with calls made for the operation of said apparatus, and means operated by the receipt of calls for operating said feeding devices.

11. In a control system for automatic apparatus, a record strip, independent electrically operated feeding devices therefor, perforating devices arranged in the rear of said feeding devices, means for operating said perforating devices in accordance with calls made for the operation of said apparatus, and means operated by the receipt of calls for operating said feeding devices, contact devices arranged intermediate said feeding devices and controlled by the perforations in said strip, and means controlled by said contact devices for setting said apparatus in operation in the successive order in which the calls are made.

12. In a control system for automatic apparatus, a record strip, independent electrically operated feeding devices therefor, perforating devices arranged in the rear of said feeding devices, means for operating said perforating devices in accordance with calls made for the operation of said apparatus, and means operated by the receipt of calls for operating said feeding devices to advance said record strip equal distances at each operation thereof.

13. In a control system for automatic apparatus, a record strip, independent electrically operated feeding devices therefor, perforating devices arranged in the rear of said feeding devices, means for operating said perforating devices in accordance with calls made for the operation of said apparatus, and means operated by the receipt of calls for operating said feeding devices to advance said record strip equal distances at at each operation thereof, and means controlled by each perforating operation for operating said feeding mechanism through one step.

14. In a control system for automatic apparatus, a record strip, means for successively perforating the same, in accordance with calls made at will for the operation of said apparatus, contact devices controlled by the perforations in said strip, means controlled by said contact devices for successively setting said apparatus in operation in the order the calls are made, and electrically operated means controlled by the perforation of said strip for advancing the perforated portion of said strip, step by step, past said contact devices.

15. In a control system for elevators, an elevator, selectively controlled differentiated devices for recording calls made at will for the operation of said elevator, and means controlled by the record made of the calls for successively inaugurating the operation of said elevator.

16. In a control system for elevators, an elevator, selectively controlled differentiated devices for recording calls made at will for the operation of said elevator, and means controlled by the record made of the calls for successively inaugurating the operation of said elevator in the order said calls were made.

17. In a control system for elevators, an elevator, selectively controlled differentiated devices for recording calls made at will for the operation of said elevator, and means controlled by the record made of the calls for successively inaugurating the operation of said elevator in the order said calls were made, and irrespective of the time said calls were made.

18. In a control system for automatic apparatus, a record strip, feed wheels suitably spaced apart over which said strip operates, selectively controlled differentiated devices for registering calls for the operation of the automatic apparatus upon said strip, electrically operated means controlled by the registry of said calls for operating said feed wheels, and means independent of and arranged between said wheels and controlled by the calls registered on said strip for successively inaugurating the operation of said automatic apparatus.

19. In a control system for elevators, and in combination with an elevator and selectively controlled devices for registering successive calls for the differentiated operation of said elevator, of means for successively inaugurating the differentiated operation of said elevator, said means being correspondingly controlled in successive order by the registered differentiated calls.

20. In a control system for automatic apparatus, and in combination with a record strip, and selectively controlled devices for perforating the same at will, of a feed mechanism for said strip, a stop device therefor, an electric circuit for controlling said stop device, and means controlled by the perforating devices for closing said circuit, and means controlled by the perforations in said strip for successively inaugurating the operation of the automatic apparatus.

21. In a control system for automatic apparatus, and in combination with a record strip, and selectively controlled devices for perforating the same at will, of a feed mechanism for said strip including a drum over which said strip passes, means normally operating to rotate said drum in feeding direction, a stop to prevent said rotation, electrically operated means controlled by said perforating devices for controlling said stop, and means controlled by the perforations in said strip for inaugurating operations of the automatic apparatus in the order the perforations are made.

22. In a control system for automatic apparatus, and in combination with a record strip, and selectively controlled devices for perforating the same at will, of a feed mechanism for said strip, means controlled by the perforations in said strip for successively inaugurating operations of the automatic apparatus, and electrically operated means controlled by the perforating devices for successively advancing said strip automatically to the action of said automatic apparatus controlling means.

In testimony whereof I have hereunto set my hand in the presence of the subscribing witnesses, on this 8th day of September A. D., 1913.

HAROLD ROWNTREE.

Witnesses:
   ERNEST H. JOHNSON,
   LEMUEL M. SHIELDS.